United States Patent
Watkins (10) Patent No.: US 6,859,609 B1
(45) Date of Patent: Feb. 22, 2005

(54) PORTABLE DIGITAL RECORDER

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/502,854

(22) Filed: Feb. 11, 2000

(51) Int. Cl.$^7$ .............................. H04N 5/91; H04N 7/04; H04N 5/85
(52) U.S. Cl. .......................... 386/46; 386/124; 386/104
(58) Field of Search ........................... 386/46, 1, 4, 27, 386/33, 38, 39, 40, 45, 52, 54, 92, 95, 96, 104, 105, 106, 107, 109, 111, 112, 117, 124, 125, 126; 348/222.1, 231.1; 338/905, 909.1

(56) References Cited

U.S. PATENT DOCUMENTS

| | | | | |
|---|---|---|---|---|
| 5,032,927 A | * | 7/1991 | Watanabe et al. ........... | 386/101 |
| 5,134,499 A | * | 7/1992 | Sata et al. ................... | 386/109 |
| 6,463,177 B1 | * | 10/2002 | Li et al. ...................... | 382/232 |
| 2002/0036694 A1 | * | 3/2002 | Merril ........................ | 348/220 |

* cited by examiner

Primary Examiner—Robert Chevalier
(74) Attorney, Agent, or Firm—Thelen, Reid & Priest, LLP (57) ABSTRACT

A method and apparatus for recording digital video and/or audio signals include input audio and video interfaces, a memory, a video frame selector, and output audio and video interfaces. In an alternate embodiment, the method and apparatus include input audio and video interfaces, a first memory, a second memory for playback, and output audio and video interfaces. Another embodiment further includes a memory optimizer for maximizing a chosen criterion such as audio duration, image capture frequency or pixel resolution.

19 Claims, 11 Drawing Sheets

PORTABLE DIGITAL RECORDER

FIELD OF THE INVENTION

The present invention relates to a portable digital recorder for digital video and/or audio input.

BACKGROUND OF THE INVENTION

Conference meetings and classroom presentations have sometimes been recorded in an audio/visual (A/V) format. In the past, film cameras used photographic film, which had to be chemically developed for the images and synchronized with the audio track to become available for viewing. Camcorders have been made available more recently; these employ magnetic tape to store analog A/V. The recorded events can be played back after the tape has been rewound. However, tape editing can be labor-intensive, and the tape may not be reviewed until the recording is completed.

More recently, the introduction of the digital camera has further facilitated portability and convenience for A/V recordings that do not require motion-picture video. Consumer demand has reduced the prices for digital cameras. Pre-programming of the recording sequence is available either directly or through website control. The received video may be supplied by an inexpensive optical lens and low-pass filter to focus the light onto typically one charge-coupled device (CCD) or a prism with three such image sensors. Digital cameras typically have sixty-four grey levels or thirty-two levels of red-green-blue (RGB) color with 320×240 pixel resolution at about ten frames per second digitally transmitted via a serial or parallel port to a computer. Such digital cameras may use lossy compression to reduce the memory requirements for storing the images such as developed under the Joint Photographers Expert Group (JPEG) standard.

A digital camera typically includes a liquid crystal diode (LCD) display to view the image in real-time (contemporaneous with recording) for monitoring the image quality. The LCD display provides visual feedback for focal-stop aperture setting, lens focusing, background cropping, etc. Subsequent playback may be provided by connecting the digital camera to a television set. Television receivers are generally compliant with either the National Television Systems Committee (NTSC) standard in North America, or the Phase Alternating Line (PAL) standard. Alternatively, the image may be played back on a personal computer (PC) through a PC attachment (PC-ATA) interface.

The video information may be represented by pixels having either RGB or YUV component values. In the YUV, brightness or luminance is denoted by Y, and chromance by U and V, where U may be represented as B–Y (blue minus luminance) and V as R–Y (red minus luminance). A video decoder may format video data for display under one of a commonly used set of sampling frequencies, which are described as multiples of 3.75 MHz, the lowest common frequency for NTSC and PAL. For example, a 4:2:0 system digitizes Y at sampling frequency of 13.5 MHz, while U and V are sampled at 6.75 MHz every other line. A 4:4:4 system samples the luminance and color channels all at 13.5 MHz.

Figure 1:
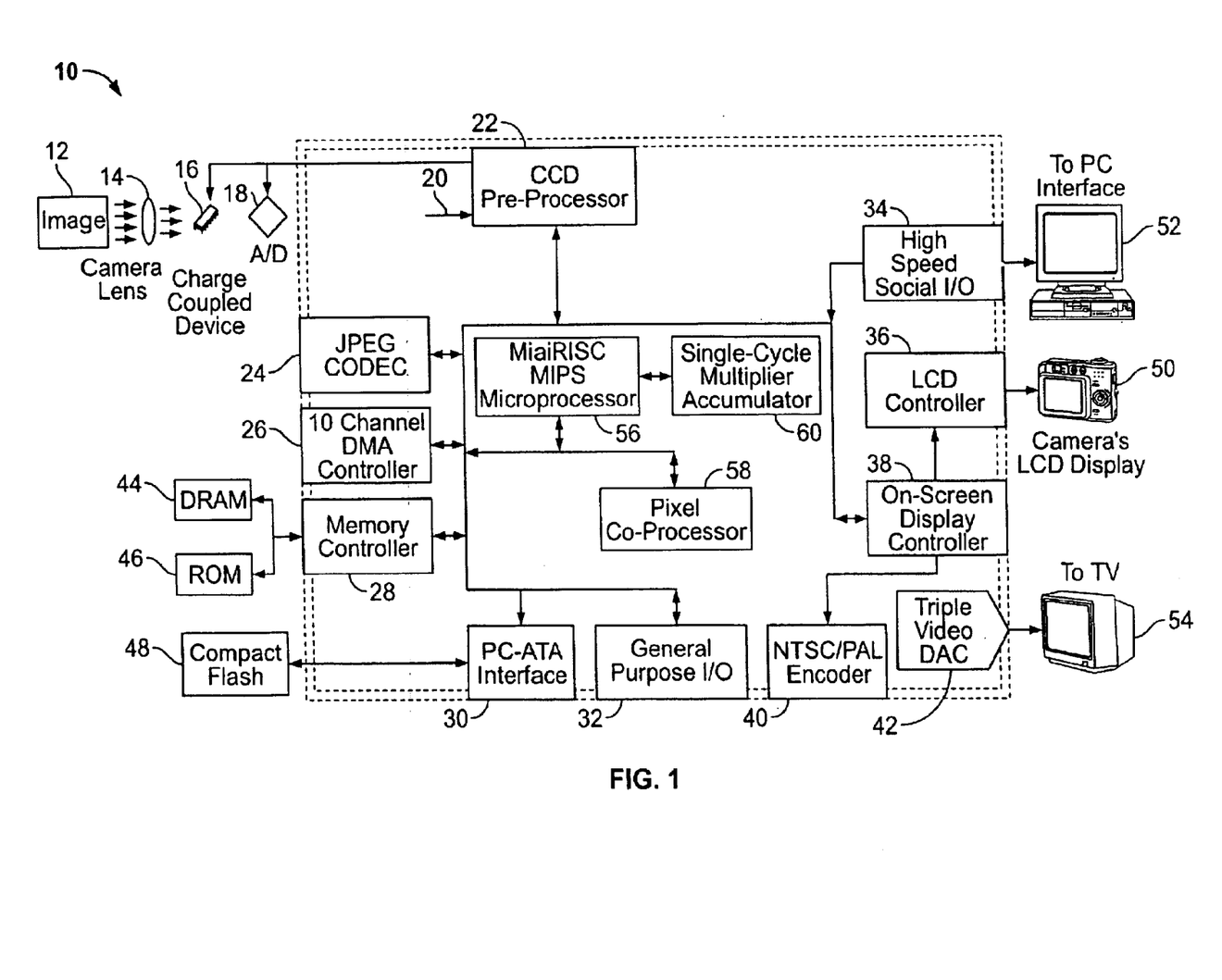
FIG. 1 is a block diagram illustrating a digital camera chip and associated hardware in accordance with the prior art.

A system block diagram of a commercially available digital camera chip is presented in FIG. 1. This example is available from LSI Logic Corporation of Milpitas, Calif. The digital camera (dcam) device 10 of the depicted example is designed to receive an image 12. The camera lens 14 focuses the image 12 for the photons to be counted in the CCD 16. The image is digitally converted by the analog-to-digital converter (ADC) 18. The ADC 18 produces an input signal 20 to the CCD pre-processor 22 in the digital camera device 10.

The pre-processor 22 transmits data to several interconnected components including a JPEG coder/decoder (codec) 24, a 10-channel direct memory access (DMA) controller 26, a memory controller 28, a PC-ATA interface 30, general purpose input/output (I/O) interface 32, a serial I/O interface 34, and an on-screen display controller 36. The display controller 36 controls a LCD video controller 38 and a NTSC/PAL encoder 40 with a video digital-to-analog converter (DAC) 42.

The memory controller 28 may retrieve processing instructions stored in dynamic random access memory (DRAM) 44 and/or read-only memory (ROM) 46. The PC-ATA interface 30 may be associated with flash memory 48 or PC card, in which the received image 12 may be stored for subsequent retrieval. The LCD controller may be connected to the camera's LCD display 50 to provide immediate visual feedback to the digital camera operator. As an alternative to the small screen provided by the LCD display 50, the serial I/O 34 may be linked to a PC interface 52 attached to a video monitor. The video DAC 42 may be connected to a television set 54 or other monitor as an alternative A/V display device.

The introduction of the reduced instruction set computer (RISC) has facilitated processing for some applications. The dcam device 10 may be controlled by a central mini-RISC microprocessor 56. Image rendering may be performed by a pixel coprocessor 58. A single-cycle multiplier/accumulator 60 may support auxiliary image processing. Real-time operating systems for A/V embedded application processing in RISC chips include Nucleus, pSOS and VxWorks. Nucleus is available from Accelerated Technology Inc. of Mobile, Ala.; pSOS is available from Gespas, Inc. of Mesa, Ariz.; VxWorks is available from Wind River Systems of Alameda, Calif.

Current digital cameras have a number of drawbacks, however. Recording parameters such as the image capture interval and pixel resolution must be decided ahead of time using pre-programmed instructions, thereby limiting operational flexibility. Also, digital cameras do not permit simultaneous playback during the recording process. After the A/V recording has begun, a person arriving late to the presentation cannot review the previous exchanges without interrupting the ongoing recording of the current proceedings.

Memory usage in a digital camera is not optimized to maximize a particular feature, such as record duration. Typically, the user must resolve competing issues manually to most efficiently utilize the available memory. If during a presentation, an important image should be recorded, an earlier lower priority image cannot be easily overwritten. Instead, additional memory must be provided until it is consumed.

Editing can be performed only after the recording has been completed. In order to create multiple versions of the A/V record to disseminate to separate destinations, several copies of the recorded source data are needed, with the attendant costs in additional equipment and time devoted to playback and editing.

SUMMARY OF THE INVENTION

A method and apparatus for recording digital video and/or audio signals include input audio and video interfaces, a memory, a video frame selector, and output audio and video interfaces. In an alternate embodiment, the method and apparatus include input audio and video interfaces, a first memory, a second memory for playback, and output audio and video interfaces. Another embodiment further includes a memory optimizer for maximizing a chosen criterion such as audio duration, image capture frequency or pixel resolution.

OBJECTS AND ADVANTAGES OF THE INVENTION

The invention is designed to enable improved capabilities in a portable digital recorder for A/V events at meetings, classrooms or other documented formats. These features include but are not limited to:
(a) control of audio signals and visual imagery for conditional capture based on selected criteria or with changes in time,
(b) playback of an A/V recording while recording proceeds apace,
(c) audio input from a separate channel connected to a website including insertion of markers for extraction of selected recording segments for separate destinations,
(d) automatic optimization of memory as constrained by video resolution targets and recording time,
(e) interactive website control of the recording based on data transmission rate and pixel resolution targets, and
(f) compressing image differences with time for displaying difference in meeting activities.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of the within disclosure.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith.

The present invention is directed to a portable digital recorder, also known as a portable digital terminal or PDT for audio/visual (A/V) recording. The PDT may incorporate input interfaces for audio and video signals, a memory for storing the input signals, a video frame selector, and output audio and video interfaces. In addition or alternatively to the video frame selector, the PDT may include an auxiliary memory (e.g., a segregated memory location) for playback. The PDT may further include a memory optimizer for maximizing a chosen criterion such as audio duration, image capture frequency or pixel resolution.

Image Selection

The PDT may receive an image to be stored in a first memory segment. A second received image may be temporarily stored in a buffer, for example. The processor stores the second received image in a second memory segment if a condition (selected by the user) satisfies a capture state. If not, the second received image may either be discarded or overwrite the first received image. The condition may be determined by comparison in a pixel differencer, a time-elapse clock, or devices activated by sound (e.g., voice), motion or light. In the case of the pixel differencer, if the buffer image differs from the stored image beyond a particular threshold, the buffer image may be separately stored in memory. If the difference does not exceed the threshold, the buffer image may either overwrite the previous frame (to update the image) or be discarded.

Figure 2:
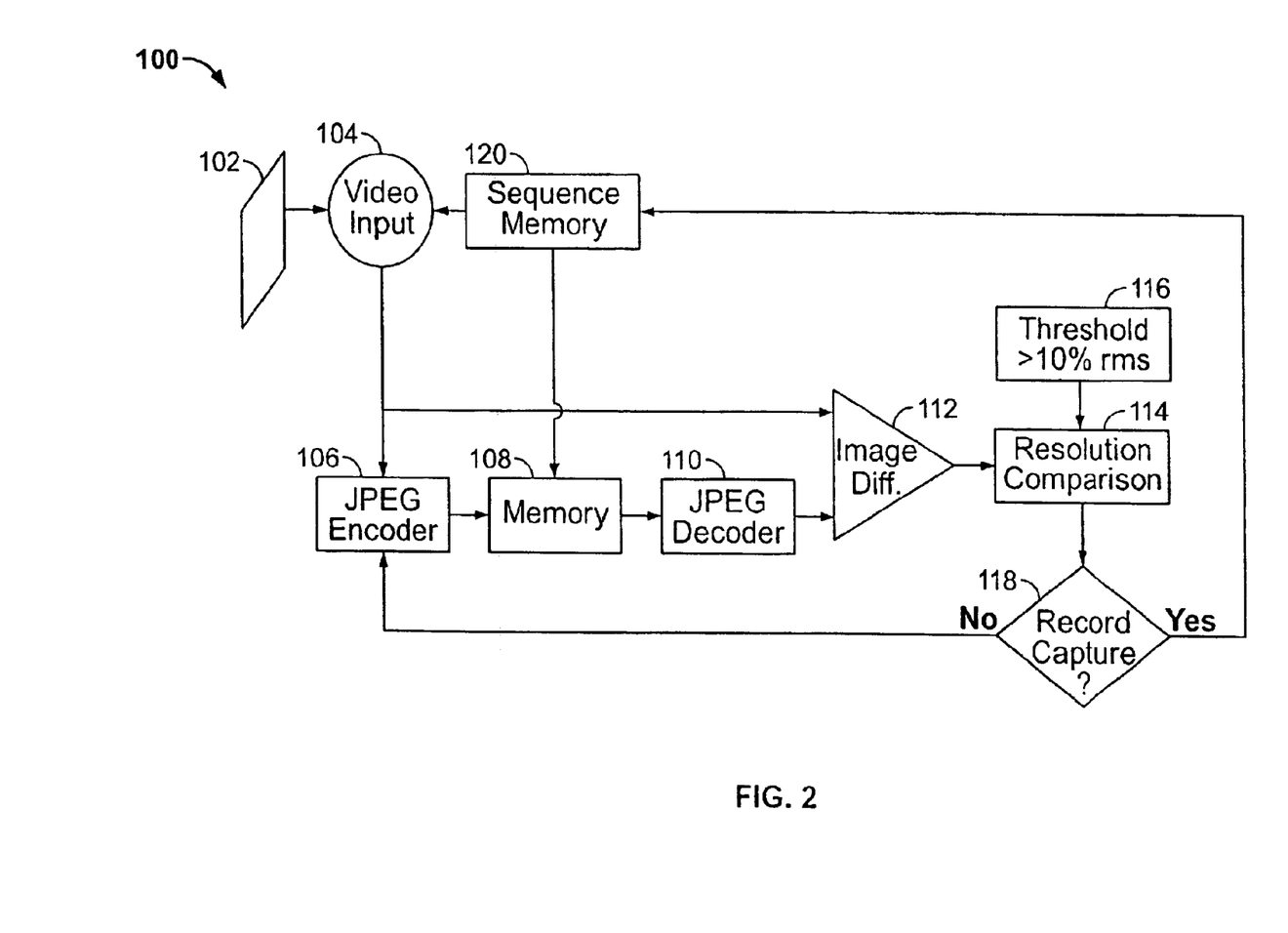
FIG. 2 is a block diagram illustrating a digital camera chip and associated hardware in accordance with a presently preferred embodiment of the present invention.

An example block diagram of the digital camera 100 for the PDT may be seen in FIG. 2, wherein an image 102, such as from a viewgraph presentation, is rendered as a video receiver 104. The video receiver 104 may include a lens, CCD and ADC. The received image may be transferred to a JPEG encoder 106. The encoded image frame may be stored in memory 108 at a first memory segment. The video receiver 104 may include a memory buffer to temporarily maintain a subsequent image before it is encoded. An encoded image frame may be forwarded to a JPEG decoder 110 to send a current decoded frame to an pixel differencer 112, which compares the current decoded frame to a subsequent image frame in the video receiver 104. The difference quantity from the pixel differencer 112 is compared to a pixel threshold value in a comparison device 114. The threshold requirement 116 may be selected by the user, or may be set at a default of ten-percent root-mean-squared (rms) between the current and subsequent image frames.

A record-capturing processor 118 may be imposed for determining whether or not the subsequent image frame should be stored in memory 108 at the first segment after being encoded in the JPEG encoder 106. The comparison device 114 may yield one of two states, depending on whether the image difference from the pixel differencer 112 exceeds the threshold or not. If the difference from the comparison device 114 exceeds the pixel threshold, the subsequent image may be encoded by the encoder 106 and be stored in a second memory segment. The selection of a memory segment within the memory 108 may be performed by a sequencer 120. If the difference does not exceed the pixel threshold, the subsequent image may either be discarded or replace the previous encoded frame in the first memory segment. If an encoded image frame consumes about 100 kB of memory, a typical memory medium of 10 MB used for a PDT may be expected to hold about one-hundred image frames.

Alternatively, the pixel differencer 112 may be replaced by a time-elapse clock mechanism, a voice activator, a motion sensor or a light-sensitive device to establish the criterion to be compared in the comparison device 114. A clock mechanism may be used to enable storing images at a specified interval or image capture frequency rate. A voice activator, motion sensor or photon detector in a light-sensitive device may be used to determine whether the ambient conditions have altered sufficiently from the most recent frame in memory in order that a subsequent image may be stored.

The sources for audio and video may be made independent of each other, permitting reception from separate locations to be used. Video sources may include a camera view, hardcopy diagram, an Internet website and a pre-recorded illustration. This feature also enables live meetings to be broadcast over a network. Audio input may be received from multiple sources. Selected audio input or time markers may be inserted into memory to identify selected portions for A/V segments to be extracted and forwarded to separate destinations. Such markers may facilitate subsequent review of selected events in the recording.

Figure 3:
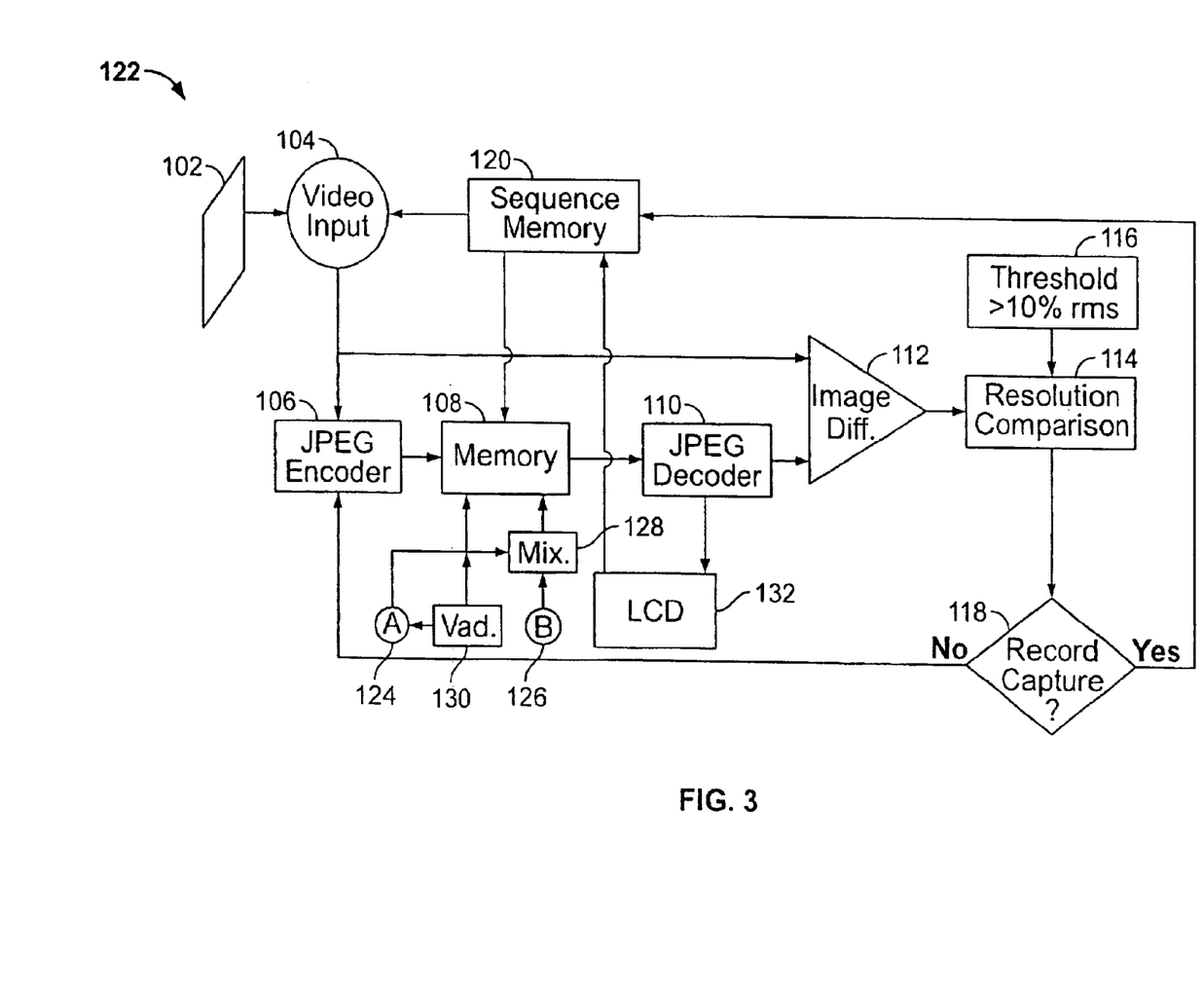
FIG. 3 is a block diagram illustrating a digital camera chip and associated hardware in accordance with a presently preferred embodiment of the present invention.

An example of the separate audio channel may be illustrated in block diagram of FIG. 3 featuring the digital camera 122 having common components to those featured in FIG. 2 and repeating the same item numbers. In addition to the encoded image frame from JPEG encoder 106, the memory 108 also receives an audio input from a first microphone "A" 124, to record the speaker's voice during the presentation. A second microphone "B" 126 may be included from a remote site (e.g., on a network).

The audio inputs from microphones "A" 124 and "B" 126 may be combined in a mixer 128 for storing in memory 108. The first microphone "A" 124 may alternatively be input to a voice activated device 130. Sound transmitted through first microphone "A" 124 may satisfy the condition storing an image in memory 108. Also, a person or object moving within range of a motion sensor may register as an observable change in the recording environment, satisfying the condition to store an image frame.

Playback During Recording

The PDT may include playback capability from an auxiliary memory location to enable review of prior recorded memory segments during simultaneous AN recording. Because the image as an encoded frame may be directed to a plurality of memory storage locations, a previously stored portion of the recording may be retrieved by a playback feature while the remainder of the session continues to be recorded. Rapidly responding controls for forward, reverse, play and pause may enable the user to access a separate playback memory location while leaving the recording memory location undisturbed. A decoded frame may be played back from the decoder 110 through a LCD display 132 in a typical format such as 4:2:0. The audio playback may be performed via a speaker or a remote pair of headphones.

As an example of this utility, the meeting record may be replayed for a person composing the minutes of the meeting or be downloaded to a PC or sent over the Internet or by email, if a browser or email server is installed. Or a late-corner may review selected images. The entire meeting may be made available by email or on a web site or in a database. The browser may have a RealAudio codec and/or a RealVideo codec, in which the A/V recording may be translated into uncompressed files. RealAudio and RealVideo are software for streaming audio and video over the Internet, available from RealNetworks of Seattle, Wash.

The A/V recording may be played back locally on the LCD video display unit and the speaker (for audio output), or alternatively, through a remote display screen and headphone outlet, both connected to the PDT through the digital camera. The LCD included in the PDT or a separately connected remote display screen might be larger than the video display typically included in a digital camera.

Figure 4:
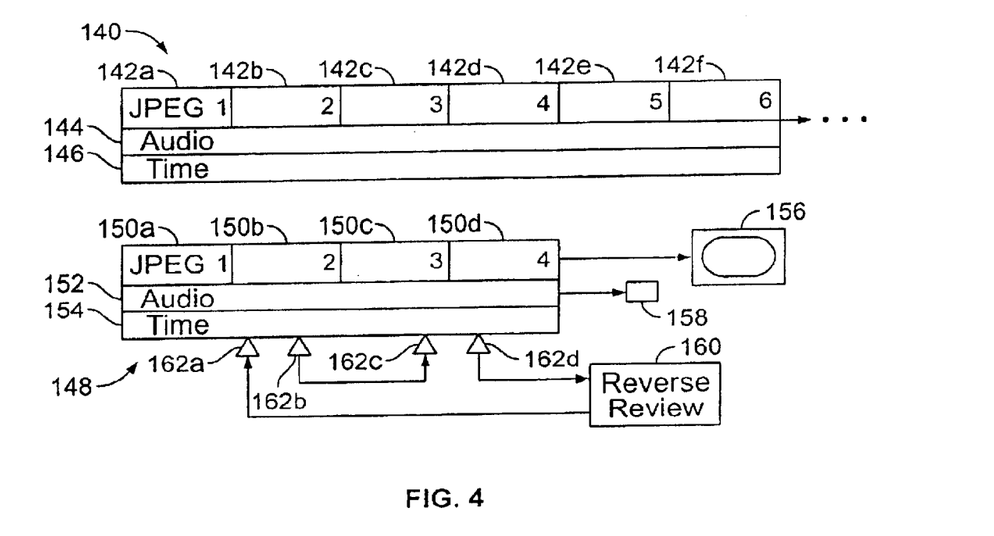
FIG. 4 is a block diagram illustrating the reverse and review functions in accordance with a presently preferred embodiment of the present invention.

FIG. 4 features a block diagram illustrating separate memory segments for recording and simultaneous playback in the PDT memory. The first memory location 140 shows a record with a series of image frames JPEG-1 as 142a, JPEG-2 as 142b, JPEG-3 as 142c, JPEG-4 as 142d, JPEG-5 as 142e, JPEG-6 as 142f and so forth as the recording continues. The first memory location 140 also continuously stores an audio track 144 and a time marker 146. The second memory location 148 shows the same stored image frames as the first memory location 140 with frames JPEG-1 as 150a, JPEG-2 as 150b, JPEG-3 as 150c and JPEG-4 as 150d along with an audio track 152 and a time marker 154. The second memory location 148 may be truncated when a playback command is issued for viewing the stored image frames on the monitor 156 and/or the voice on headphones or speaker 158.

The feature controls 160 (such as on a control panel) enable the second memory location to return to a first selected time index 162a (or other indicator) to decode and view a playback frame depicted at JPEG-2 as 150a on the time marker 154. The playback may continue until a stop is selected at second time index 162b. The playback may then skip to a third time index 162c to decode and view another playback frame JPEG-3 as 150c until fourth time index 162d to view JPEG-4 as 150d. The audio track 152 may also be heard between the third and fourth time indices 162c and 162d. Such playback commands may be issued across a network through a network signal to review the second recording segment to a website on the network.

Memory Optimization

The PDT may include a memory optimizer to efficiently conserve memory. The optimizer may calculate a maximum value for frame resolution, capture frequency, or record duration. This calculation may be based on a network data-stream transfer rate and the amount of available memory. Utilization of memory may be optimized in the PDT by selecting a video resolution target and an image capture interval by the user control functions. The digital camera processor may calculate the interval between captured images during the event being recorded. The processor may calculate the available memory subsequent images with a ten-percent rms reserve.

Figure 5:
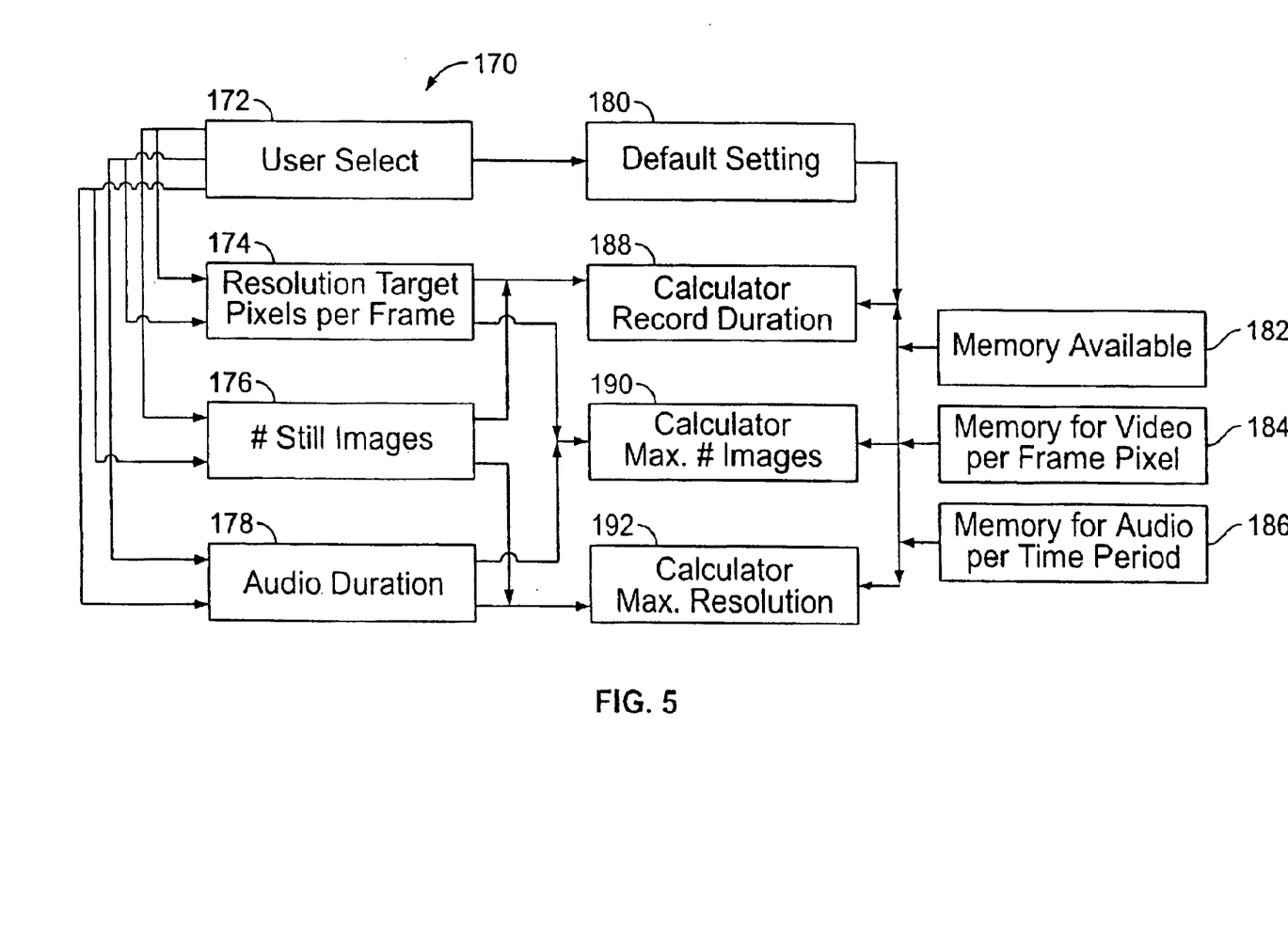
FIG. 5 is a block diagram illustrating the optimization function in accordance with a presently preferred embodiment of the present invention.

An example of the memory optimization process in the PDT may be seen in FIG. 5 featuring a block diagram of the procedure 170. The user may initiate a selection as 172 of two parameters from three options of target pixel resolution (pixels per frame) as 174, the number of image frames as 176 and record duration as 178 (dominated by the continuous audio record). The default settings as 180 may provide the remaining third parameter. Supplemental information may also include available memory as 182, required memory per frame pixel as 184, and required memory for audio per time period as 186. The memory may be described as the audio duration multiplied by the audio memory rate plus the number of video frames multiplied by their resolution (pixels per frame) multiplied by the memory per pixel.

An algorithm for determining record duration in the first calculator 188 may be employed if the target resolution 174 and the number of frames 176 are chosen in the user selection 172. The supplemental memory information 182, 184 and 186 may also be incorporated to determine the maximum audio duration that may be recorded with the available memory after the video frame requirements are accounted for. Similarly, an algorithm to determine the maximum number of image frames in the second calculator 190 may be used if the user selection 172 includes as parameters the target resolution 174 and the record duration 178.

Alternatively, an algorithm to determine the maximum frame resolution in the third calculator 192 may be used if the user selection 156 includes as parameters the number of frames 176 and the record duration 178. The user-selected parameters and the calculated and default information may then be used to allocate the memory segments. In this manner, the presentation may be recorded with sufficient memory allocated for the entire duration and with minimum excess memory. If the images to be captured in memory are transmitted across a network through a port, the number of image frames may be substituted by a capture frequency, since the minimum interval between image captures will be based on the data-stream transfer rate.

Figure 6:
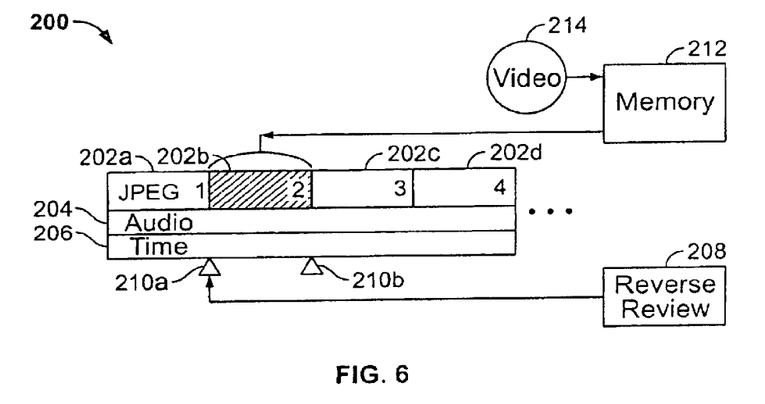
FIG. 6 is a block diagram illustrating the reverse and overwrite functions in accordance with a presently preferred embodiment of the present invention.

On occasion, events may require an alteration from the original preset memory allocation. As an example, if more viewgraphs are presented during a meeting than were originally anticipated, the memory may be searched to find a previously stored image frame deemed less important in order to be overwritten with a subsequent and more important image frame. FIG. 6 presents a block diagram of a memory segment 200 with frames JPEG-1 as 202a, JPEG-2 as 202b, JPEG-3 as 202c, JPEG-4 as 202d and so forth, an audio track 204 and a time marker 206. The function controls 208 enable the memory segment 200 to be reviewed for finding frame JPEG-2 as 202b between indices 210a and 210b. The image frame stored for JPEG-2 may be overwritten in memory device 212 by the subsequent image frame being received through the video input 214. Thus, memory may be conserved and an important image may be stored for future use at the expense of only an image selected by the user as less important.

Editor Segregation

Time-markers may be used to annotate and send segmented portions of the recording to designated recipients, directly from the recording. Editing and annotation of the recording may be tailored so that specific recipients may have access to only those portions selected by the editor. This option may be facilitated through one or more user input devices, such as a keyboard, a RCU, control panel, or other cursor-pointing device (such as a mouse, trackball, trackpad, or touchscreen), a microphone (for voice annotation) and/or a time-mark locator (or other such index identifier to find marks placed in memory). Alternatively for editing, the A/V data may be downloaded from the PDT to a PC via the exchange of a flashcard. The marking process eliminates the need to have multiple persons from separate departments view the entire presentation record merely to examine one small portion of interest. Additionally, such record segregation enhances security measures to restrict distribution of sensitive information.

Figure 7:
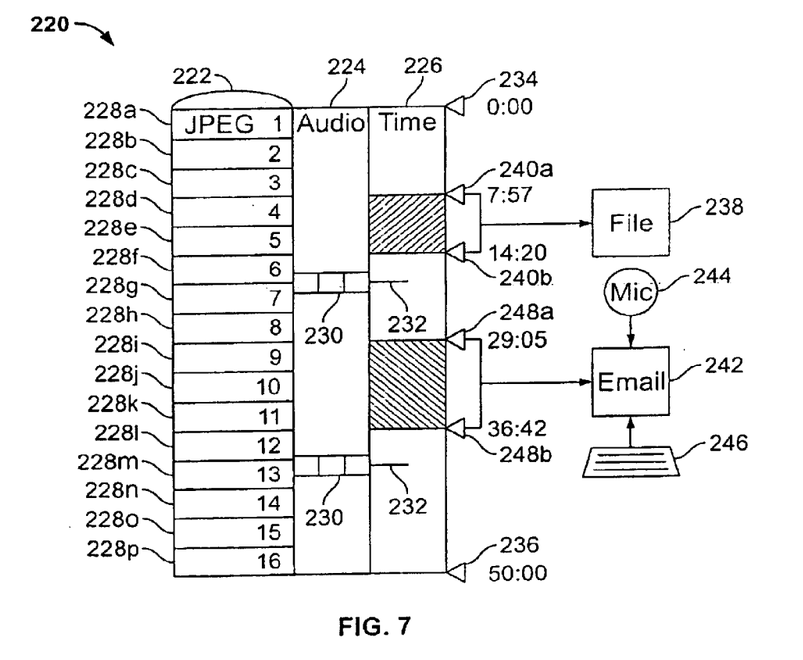
FIG. 7 is a block diagram illustrating the selection, edit and file record functions in accordance with a presently preferred embodiment of the present invention.

As an example, in FIG. 7, a presentation record 220 is represented in a block diagram featuring a video track 222, an audio track 224 and a time marker 226. The video track 222 may be subdivided by image frames JPEG-1 as 228a, JPEG-2 as 228b, JPEG-3 as 228c and so forth through JPEG-16 as 228p. The audio portion may begin with voice activation events 230, after periods of audio inactivity 232. The time marker may be initiated at a relative begin time 0:00 as 234 (such as after voice activation) and end at the pre-selected duration of 50:00 (minutes) as 236.

An editor may decide to create a file 238 that includes JPEG-4 as 228d and JPEG-5 as 228e with corresponding audio between time indices 7:57 as 240a and 14:20 as 240b. The file 238 may store the time indices as pointers in memory for subsequent retrieval and review of the frame contents. The editor may alternatively decide to create an email enclosure 242 for transmission to a selected recipient, with voice annotation from a microphone 244 (added to the audio) or a keyboard 246 for inserting comments of probable interest to the recipient and identifying visual features on the image frames. In this example, the email enclosure 242 captures the recorded period between time indices 29:05 as 248a and 36:42 as 248b. The time-indices are provided for example description only, and are not intended to represent any limitation in the claims.

Image Compression

The video imagery as depicted by a series of multi-pixel frames may constitute the largest portion of the memory requirements for an A/V presentation. In order to reduce the memory consumption, the JPEG standard provides a variety of lossy image compression methods, such as the widely used discrete cosine transform. Such methods convert the pixel attributes into a waveform series, truncating the higher order terms, resulting in reduced memory requirements in exchange for a diminution of detail. Such compression may be performed in software or hardware.

Differences between images may also be used to reduce memory consumption. A first image pattern may be stored, followed by either a second image pattern or the difference between the second and first images. The memory for these may be further reduced by performing a transform compression on the first image and the second difference. The image difference comparison may examine time-elapse pixel-by-pixel changes between the first image to the second image. Some image differences may represent random noise, but some portions may reflect differences between presentation images or changes otherwise detectable with a motion sensor. The image may be restored by uncompressing the compressed frame, although the compression technique may cause a minor degradation in fidelity.

Figure 8:
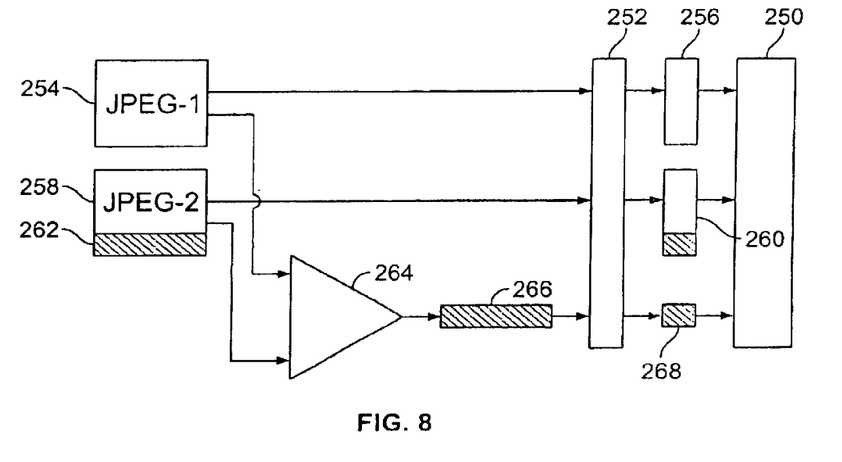
FIG. 8 is a block diagram illustrating the image translation compression in accordance with a presently preferred embodiment of the present invention.

A representation of this compression technique may be seen in the FIG. 8 block diagram. Image frames may be stored in a memory 250 associated with the PDT. A lossy image compressor 252 may reduce the quantity of memory 250 needed to store each image. A first image frame JPEG-1 as 254 may be compressed by the image compressor 252 in the PDT resulting in a first compressed frame 256 and stored in memory 250. A second image frame JPEG-2 as 258 may also be compressed by the image compressor 252 resulting in a second compressed frame 260 and stored in memory 250.

The second image frame JPEG-2 as 258 differs from JPEG-1 as 254 in specific pixels that may be mapped as a frame difference 262. To exploit this frame difference 262 for reducing memory consumption, the first image frame JPEG-1 as 254 and the second image frame JPEG-2 as 258 may be input to a differencing device 264 to isolate and determine the isolated difference 266. This isolated difference 266 may be input to the image compressor 252 as an alternative to the second frame JPEG-2 as 258 to produce a compressed difference 268, which may then be stored in memory 250.

Hardware and Software

Figure 9:
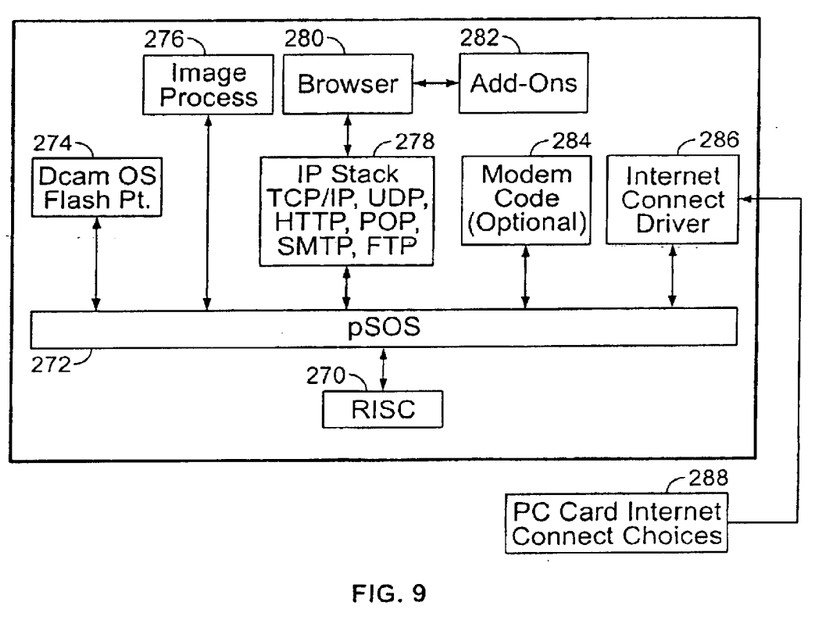
FIG. 9 is a block diagram illustrating the software structure for the digital camera chip in accordance with a presently preferred embodiment of the present invention.

In order for the digital camera chip within the PDT to provide much of the above-described functionality, specific application executable programs should be included as software, in cooperation with the operating system (OS) for the RISC processor. The PDT software structure shown in FIG. 9 provides an indication of the capability of the invention. The software structure may be operated by a RISC chip 270 on which may run the pSOS as 272. The pSOS 272 in turn executes the digital camera OS as 274, a photograph processing program 276 such as Adobe Photo Delux from Adobe Systems Inc. of San José, Calif., and an internet protocol (IP) stack 278 providing software for external communication such as transmission control protocol/internet protocol (TCP/IP), hypertext transfer protocol (HTTP), user datagram protocol (UDP), point of presence (POP), simple mail transfer protocol (SMTP), and file transfer protocol (FTP).

The image processing program 276 may include an image compression method as illustrated in FIG. 8 for reducing the memory consumption of stored image frames. The IP stack 278 may be connected to a network browser 280, on which an add-on device driver 282 such RealAudio and RealVideo may be included. An optional modem code 284 and/or a network connect driver 286 may be included to receive input from a PC card 288 among a variety of Internet connection selections.

The optics for received video input may be placed on a tether to capture images from a digital camera positioned a finite distance from and transmitting via the tether to the PDT. Multiple tether optics may be connected to the PDT so as to enable 360° (or $2\pi$) simultaneous panoramic views for viewer panning or selective view capture or panoramic 360° capture.

The PDT may include a controls feature panel or a remote control unit (RMU) along with an optional keyboard. In order to increase flexibility for the user, the keyboard may be remapped or have macros built from select keys to reduce keystrokes for repeated command sequences. Furthermore, in the event that a flashcard is not available, the RCU may be used to download the AN data to a remote recorder or to a web site having access to a memory medium.

The PDT may be a standalone device intended for placement on a table or other stationary platform for the duration of the event to be recorded, such as a meeting. The housing or case for the PDT may be received on a pedestal or other stand for maintaining an upright position. A smaller design for the PDT may be connected to a wristband with incorporation of a clock to produce a multi-mode wrist-watch that may provide time, date, alarm, timer, chronograph, in addition to AN recording and playback. Alternatively, a smaller PDT design may be insertable in a pocket.

Figure 10:
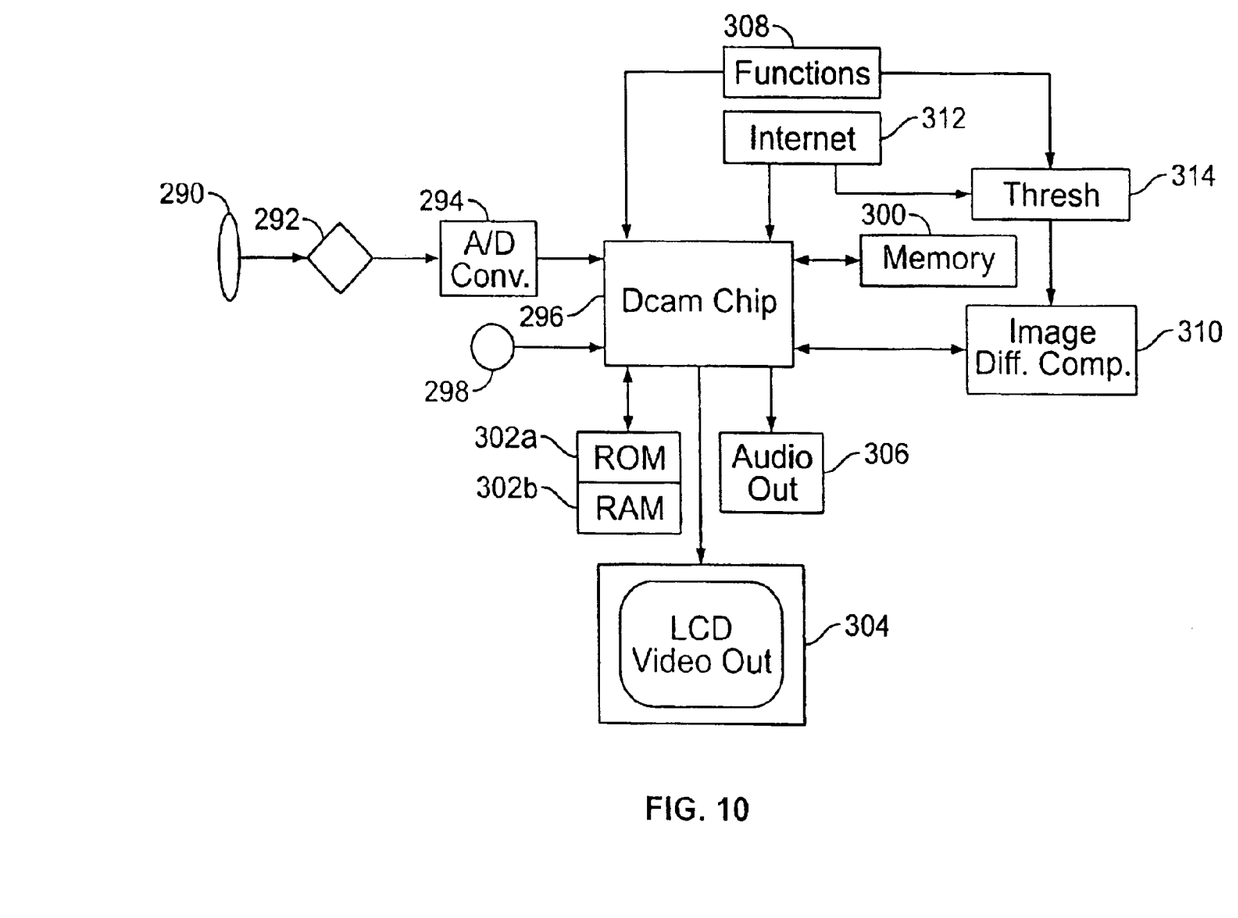
FIG. 10 is a block diagram illustrating the portable AN recorder software in accordance with a presently preferred embodiment of the present invention.

A block diagram is depicted in FIG. 10 summarizing the components of the present PDT invention. An image may be received through a lens 290 and sent to a CCD 292, digitally converted in an A/D converter 294 before being received by a digital camera chip 296 having software capabilities as described in FIG. 9. A microphone 298 may receive audio signals to be received by the digital camera chip 296. Associated with the digital camera chip 296 are a memory device 300 for recording images and audio, along with ROM 302a and DRAM 302b for processing. Optionally, the digital camera chip 296 may also be associated with a LCD video display 304, an audio output port 306 such as a headphone jack or a speaker, a user-function input device 308 such as a RCU or a keyboard or a control panel, and an Internet connection. An image difference comparer 310 may also be included, either by a hardware component or within software to perform this function. The user-function input device 308 and the Internet connection 312 may be used to provide instructions to the digital camera chip 296. The image difference comparer 308, as described in FIG. 2, may compare the difference of one image to another image against a threshold input 314, which may be supplied by the user-function input device 308 or across an Internet connection 312. Images in memory may be stored in memory by the digital camera chip 296 as described in FIG. 2, based on the comparison of the image difference to the threshold.

The LCD display may be augmented to include unobtrusive messages for system warnings or for incorporation of instructions or annotation from an optional keyboard or RCU. The unobtrusive nature of the messages may enable the video images to be viewed fully or partially while providing valuable information to the viewer. For example, alarm or diagnostic signals may be provided to indicate the viewer or user one or more of many possible conditions, such as limits on available memory for image capture, error status (e.g., codec failure to compress an image), timeouts such as for replacing flashcards, and connection warnings. The LCD display may also have a pan-and-scan option with up to 12-size font, so that text on a whiteboard may be read and interpreted as text, thereby reducing memory requirements and facilitating alpha-numeric searches.

Low-Cost Embodiment

A lower cost version of the wrist portable PDT might not include a browser or Internet connection, thus requiring less DRAM and eliminating the need for a second PC card slot. The tethered optics may also sacrifice quality to reduce cost, such as a PC desktop camera eye with video graphics array (VGA) resolution or a pen camera with less than VGA resolution. As with the standalone PDT, the wrist portable PDT has a number of I/O ports to receive or transfer data.

Figure 11:
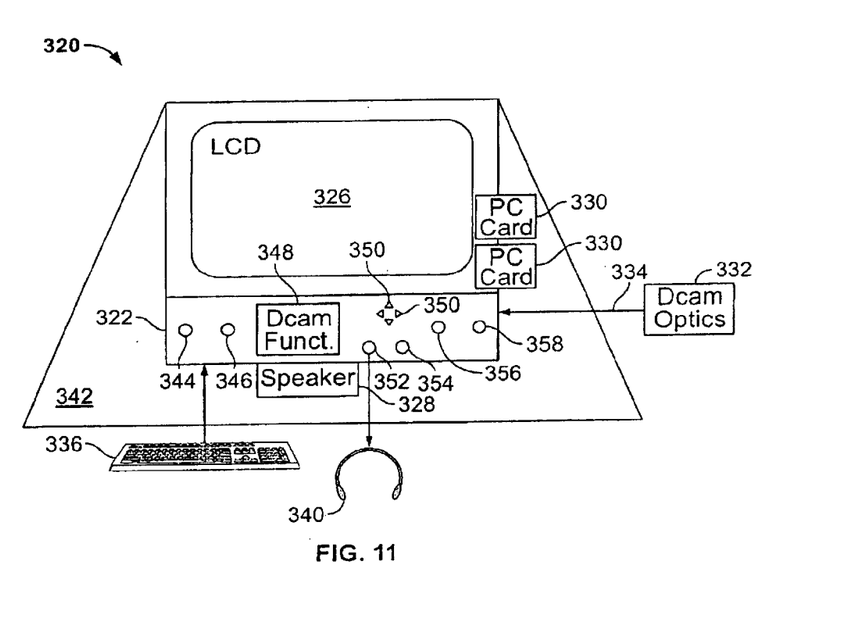
FIG. 11 is a diagram of the portable A/V recorder on a platform stand in accordance with a presently preferred embodiment of the present invention.

One embodiment of the PDT can be seen in FIG. 11 for the platform model. The platform model 320 may comprise a digital camera 322 in a case 324, a LCD display 326 for video display, a speaker 328 for audio broadcast, one or two PC cards 330 with appropriate insert slots, digital camera optics 332 on a digital bus tether 334, an optional mini-keyboard 336 connected by a tether 338, an optional pair of headphones 340 for audio output, and an optional stand 342 for removably positioning the model 320. The stand 342 may have flat base and quadrilateral front view. The digital camera 322 may feature a power on/off switch 344, a function select button 346, a digital camera function command panel 348, arrow keys 350 for cursor control, a headphone jack 352 for the optional headphones 340, a microphone 354, a miniature trackball (or mouse ball) 356 and an enter key 358.

The function select button 346 may enable keyboard attachment, an RCU, PC synchronization (for data transmission), or an electronic-book page-turner. The display 326 may be 7.5 inches diagonal (rather than 2 inches diagonal in a typical digital camera) with an image arrangement of 640×480 pixels. The PC cards 330 may be used for transmission to flash memory or receipt of an Internet connection.

Figure 12:
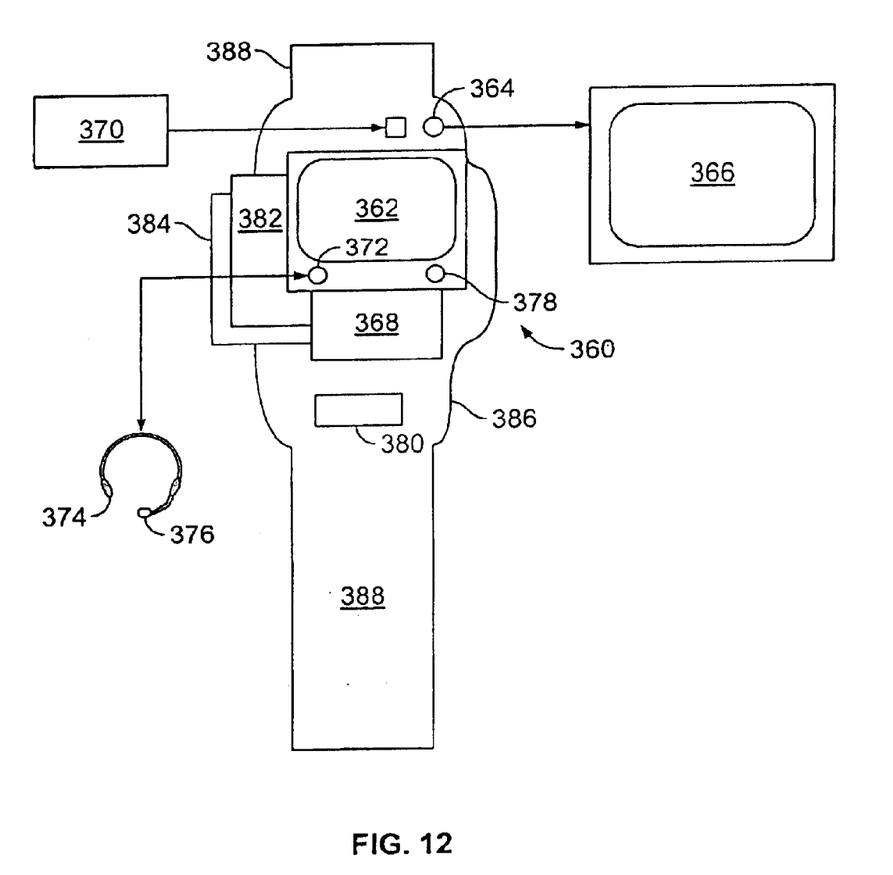
FIG. 12 is a diagram of the portable AN recorder on a wristband showing connected peripheral output devices in accordance with a presently preferred embodiment of the present invention.

Another embodiment of the PDT can be seen in FIG. 12 for the web-capable wrist mobile model. The wrist mobile Mtg Mate 360 includes a LCD display 362 (suggesting a resemblance to a "Dick Tracy" wristwatch) and an output port 364 to support a larger display unit 366. The digital camera function control panel 368 provides access to interface commands to the digital camera, and includes the same or similar features as depicted in the FIG. 10 panel 348. Also included may be digital camera input for optics 370, a headphone jack 372 to support a pair of headphones 374 with an optional microphone 376, a microphone 378, a speaker 380, and a pair of PC cards 382 and 384 in their respective card slots shown in overlapped fashion. Physically attached to the Mtg Mate 360 is a housing 386 that may be integrated to a flexible wrist strap 388, which can then be removably wrapped around an arm for wrist portability.

Figure 13:
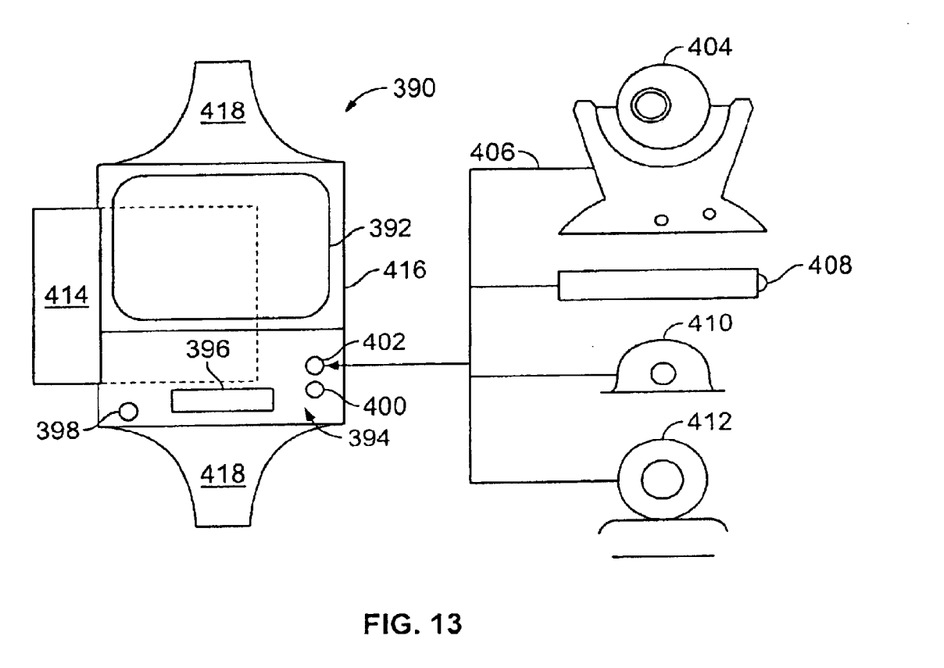
FIG. 13 is a diagram of the portable AN recorder on a wristband showing connected peripheral input devices in accordance with a presently preferred embodiment of the present invention.

Yet another embodiment of the PDT can be seen in FIG. 13 for the low-cost wrist mobile model. The low-cost wrist mobile Mtg Mate 390 includes a LCD display 392. The PDT functions are accessed on the panel 394 shown below the display 392. Within the vicinity of the panel 394 may be located a speaker 396, a jack for headphones 398, a microphone 400, and an input optics port 402 for receiving remote tethered optics, such as a webcam 404 connected via a universal serial bus (USB) 406, a pen camera 408, a camera eye 410 or digital camera optics 412. A single compact flash card 414 is inserted in a port, with dashed lines indicating the interior PDT region occupied by the card. The display 392 and panel 394 may be contained within a housing 416 and connected to a wrist strap 418 by means of a flexible hinge on either side of the housing 416.

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A portable digital terminal (PDT) for receiving recording and playback of digital audio/visual (AN) data, said PDT comprising:

a memory having a plurality of memory segments, wherein a first memory segment stores a first received image;

a buffer for temporarily storing a second received image; and a processor for storing said second received image in a second memory segment if a condition equals a first state, and not if said condition equals a second state, wherein said condition is measured by a device taken from the group consisting of an image differencer, a clock mechanism, a voice activated device, a motion sensor device, and a light-sensitive device.

2. A PDT according to claim 1 wherein said second received image is stored in said first memory segment if said condition equals said second state.

3. A PDT according to claim 1 wherein said image differencer comprises:

a pixel difference determiner for determining a pixel difference between a decoded frame and a received image frame in the video receiver;

a pixel threshold comparator for comparing said pixel difference to a pixel threshold, wherein said pixel threshold is non-zero; and a selection setter to set a selection result wherein said selection result equals a first value if said pixel difference exceeds said pixel threshold and said selection result equals a second value if said pixel threshold exceeds said pixel difference.

4. A PDT according to claim 3 wherein said pixel threshold equals ten-percent root mean square of a plurality of pixels in an image frame.

5. A PDT according to claim 1 wherein said voice activated device comprises:

an audio detector for detecting an ambient sound received from an audio input port;

a sound threshold comparator for determining whether said ambient sound has attained a sound threshold, wherein said sound threshold is non-zero; and a selection setter to set a selection result wherein said selection result equals a first value if said ambient sound exceeds said sound threshold, and said selection result equals a second value if said sound threshold exceeds said ambient sound.

6. A PDT according to claim 1 wherein said motion sensor comprises:

a motion sensor for detecting whether a movement within an arc forward of said motion sensor; and a selection setter to set a selection result, wherein said selection result equals a first value if said motion sensor detects said movement, and said selection result equals a second value otherwise.

7. A PDT according to claim 1 wherein said light-sensitive device further comprises:

a photon detector far detecting an ambient illumination received from a surrounding environment;

an albedo threshold comparator for determining whether said ambient illumination has attained an albedo threshold, wherein said albedo threshold is non-zero; and a selection setter to set a selection result, wherein said selection result equals a first value if said ambient illumination exceeds said albedo threshold, and said selection result equals a second value if said albedo threshold exceeds said ambient illumination.

8. A PDT according to claim 1, further including:

an image encoder for producing an encoded frame from said first received image;

an image compressor for transforming said encoded frame from said encoder into a compressed encoded frame for storing in said sequenced memory segment; and an image uncompressor for transforming said compressed encoded frame into an uncompressed encoded frame.

9. A PDT according to claim 1, further comprising:

a diagnostic identifier for determining whether a diagnostic condition has occurred, wherein said diagnostic condition corresponds to a status that the user should be informed;

a message selector for selecting a pre-programmed message corresponding to said diagnostic condition; and a message writer for sending said message to an A/V output port.

10. A PDT according to claim 9 wherein said diagnostic condition is selected from the group consisting of an available memory segment, an error status, a timeout, and a misconnection warning.

11. A PDT according to claim 1 wherein said clock mechanism comprises: a clock for determining a time-elapsed period;
- a time threshold comparator for comparing said time-elapsed period with a specific interval, wherein said specific interval is non-zero; and
- a selection setter to set a selection result wherein said selection result equals a first value if said time-elapsed period exceeds said specified interval, and said selection result equals a second value if said specified interval exceeds said time-elapsed period.

12. A portable digital terminal (PDT) for receiving recording and playback of digital audio/visual (AN) data, said PDT comprising:
- a memory having a plurality of memory segments, wherein a first memory segment stores a first received image;
- a buffer for temporarily storing a second received image;
- a processor for storing said second received image in a second memory segment if a condition equals a first state, and not if said condition equals a second state;
- a memory optimizer for calculating, based on a plurality of available memory segments, a maximum value for a first parameter from a set of three parameters after a second parameter and a third parameter from said set are specified by a user, said set selected from the group consisting of a pixel per frame resolution, a number of image frames, and an audio recording duration; and
- a memory allocator for allocating said plurality of memory segments based on said maximum value for said first parameter, said second parameter and said third parameter.

13. A portable digital terminal (PDT) for receiving, recording and playback of digital audio/visual (AN) data said PDT comprising:
- a memory having a plurality of memory segments, wherein a first memory segment stores a first received image;
- a buffer for temporarily storing a second received image;
- a processor for storing said second received image in a second memory segment if a condition equals a first state and not if said condition equals a second state;
- a network port for receiving a network data-stream at a known data-stream transfer rate, wherein a memory optimizer calculates a maximum audio recording duration;
- said memory optimizer for calculating, based on a plurality of available memory segments, a maximum value for a first parameter from a set of three parameters after a second parameter and a third parameter being one of either a number of image frames or an audio recording duration; and
- a memory allocator for allocating said plurality of memory segments based on said maximum value for said first parameter, said second parameter and said third parameter.

14. A method for receiving, recording and playback of digital audio/visual (AN) data in a portable digital terminal (PDT), said method comprising:
- storing a first received image in a first memory segment of a memory having a plurality of memory segments;
- receiving a second received image;
- measuring a condition, said condition being equal to one of either a first state or a second state;
- storing said second received image in a second memory segment of said memory if said condition is equal to said first state;
- calculating, by a memory optimizer for a plurality of memory segments, a maximum value for a first parameter from a set of three parameters after a second parameter and a third parameter from said set are specified by a user, said set selected from the group consisting of a pixel per frame resolution, a number of image frames, and an audio recording duration; and
- allocating said plurality of memory segments.

15. A method according to claim 14 further including:
- storing said second received image in said first memory segment if said condition equals said second state.

16. A method according to claim 14 further including:
- producing an encoded image from said first received image;
- compressing said encoded image into a compressed encoded image;
- recording said compressed encoded image in said memory; and
- uncompressing said compressed encoded image into an uncompressed encoded image.

17. A method for receiving, recording and playback of digital audio/visual (AN) data in a portable digital terminal (PDT), said method comprising:
- storing a first received image in a first memory segment of a memory having a plurality of memory segments;
- receiving a second received image;
- measuring a condition, said condition being equal to one of either a first state or a second state; and
- storing said second received image in a second memory segment of said memory if said condition is equal to said first state,
- wherein said measuring a condition comprises one of the following:
- measuring by an image differencer a pixel difference between said first received image and said second received image, and comparing by said image differencer said pixel difference to a pixel threshold to obtain a selection result, wherein said condition is said first state if said pixel difference exceeds said pixel threshold and said condition is said second state if said pixel threshold exceeds said pixel difference;
- measuring by a clock whether a time-elapsed period has attained a specified interval, wherein said condition equals said first state if said time-elapsed period exceeds said specified interval, and said condition equals said second state if said specified interval exceeds said time-elapsed period;
- measuring by a voice activated device whether an ambient sound received from the audio input port, such as through a microphone, has attained a sound threshold, wherein said condition equals said first state if said ambient sound exceeds said sound threshold, and said condition equals said second state if said sound threshold exceeds said ambient sound;
- measuring whether an ambient illumination received from a surrounding environment has attained an albedo threshold, wherein said condition equals said first state if said ambient illumination exceeds said albedo threshold, and said condition equals said second state if said albedo threshold exceeds said ambient illumination; and measuring by a motion sensor whether a movement within an arc forward of said motion sensor is detected, wherein said condition equals said first state if said motion sensor detects said movement, and said condition equals said second state otherwise.

18. A method according to claim 17 further including:

receiving a network signal, wherein said network signal is taken from the group consisting of a network audio signal, a time marker, said pixel threshold, said specified interval, and said sound threshold.

19. A programmable storage device readable by a machine tangibly embodying a program of instructions executable by the machine to perform method steps for receiving recording and playback of digital audio/visual (A/V) data in a portable digital ternlinal (PDT), said method steps comprising:

storing a first received image in a first memory segment of a memory having a plurality of memory segments;

receiving a second received image;

measuring a condition, said condition being equal to one of either a first state or a second state;

storing said second received image in a second memory segment of said memory if said condition is equal to said first state;

calculating, by a memory optimizer for a plurality of memory segments, a maximum value for a first parameter from a set of three parameters after a second parameter and a third parameter from said set are specified by a user, said set selected from the group consisting of a pixel per frame resolution, a number of image frames, and an audio recording duration; and allocating said plurality of memory segments.

* * * * *